H. FORD.
TRANSMISSION MECHANISM.
APPLICATION FILED AUG. 12, 1909.

1,005,186.

Patented Oct. 10, 1911.
3 SHEETS—SHEET 1.

Witnesses
A. M. Shannon.
A. M. Dow.

Inventor
HENRY FORD

By
Attorneys

Inventor
HENRY FORD

UNITED STATES PATENT OFFICE.

HENRY FORD, OF DETROIT, MICHIGAN.

TRANSMISSION MECHANISM.

1,005,186.

Specification of Letters Patent.　Patented Oct. 10, 1911.

Application filed August 12, 1909. Serial No. 512,502.

*To all whom it may concern:*

Be it known that I, HENRY FORD, a citizen of the United States of America, residing at Detroit, in the county of Wayne and State of Michigan, have invented certain new and useful Improvements in Transmission Mechanism, of which the following is a specification, reference being had therein to the accompanying drawings.
It is desirable that the motor, change speed mechanism, ignition system generator and the speed controlling members of an automobile be so disposed that they are not thrown out of operative relation by any shocks imparted to the chassis, and that they occupy as small space as possible without sacrificing accessibility.

This invention relates to a power plant for an automobile and more particularly to the arrangement of the motor, the ignition generator, the transmission or change speed mechanism, and the controlling members thereof to form a compact unit structure which is not affected by shocks given the chassis of the vehicle, and which while readily accessible takes up little room and is bodily removable from the vehicle for inspection and repair.

The invention consists in the matters hereinafter set forth, and more particularly pointed out in the appended claims.

Figure 1:
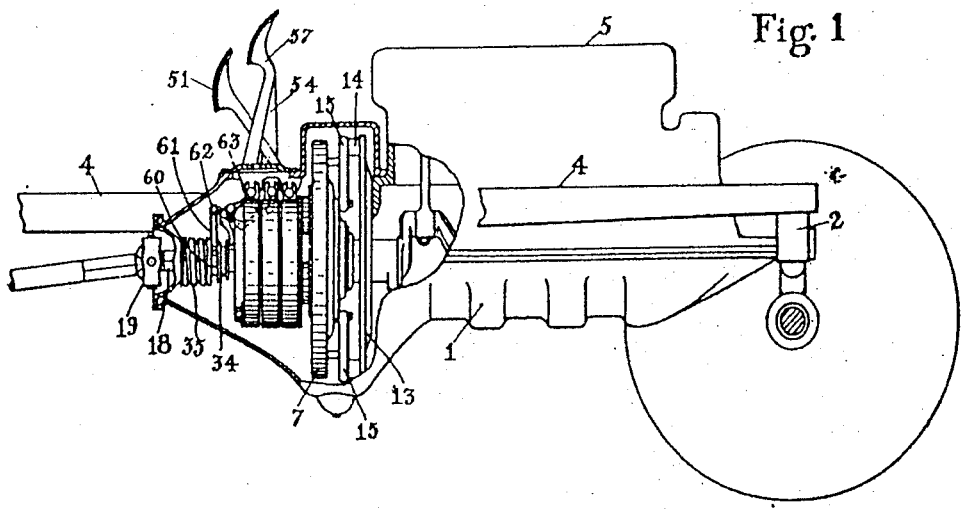
Figure 2:
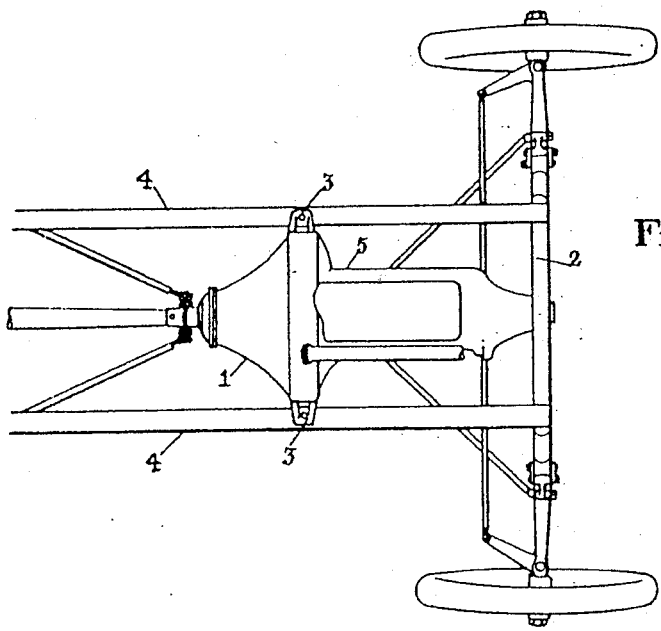
Figure 3:
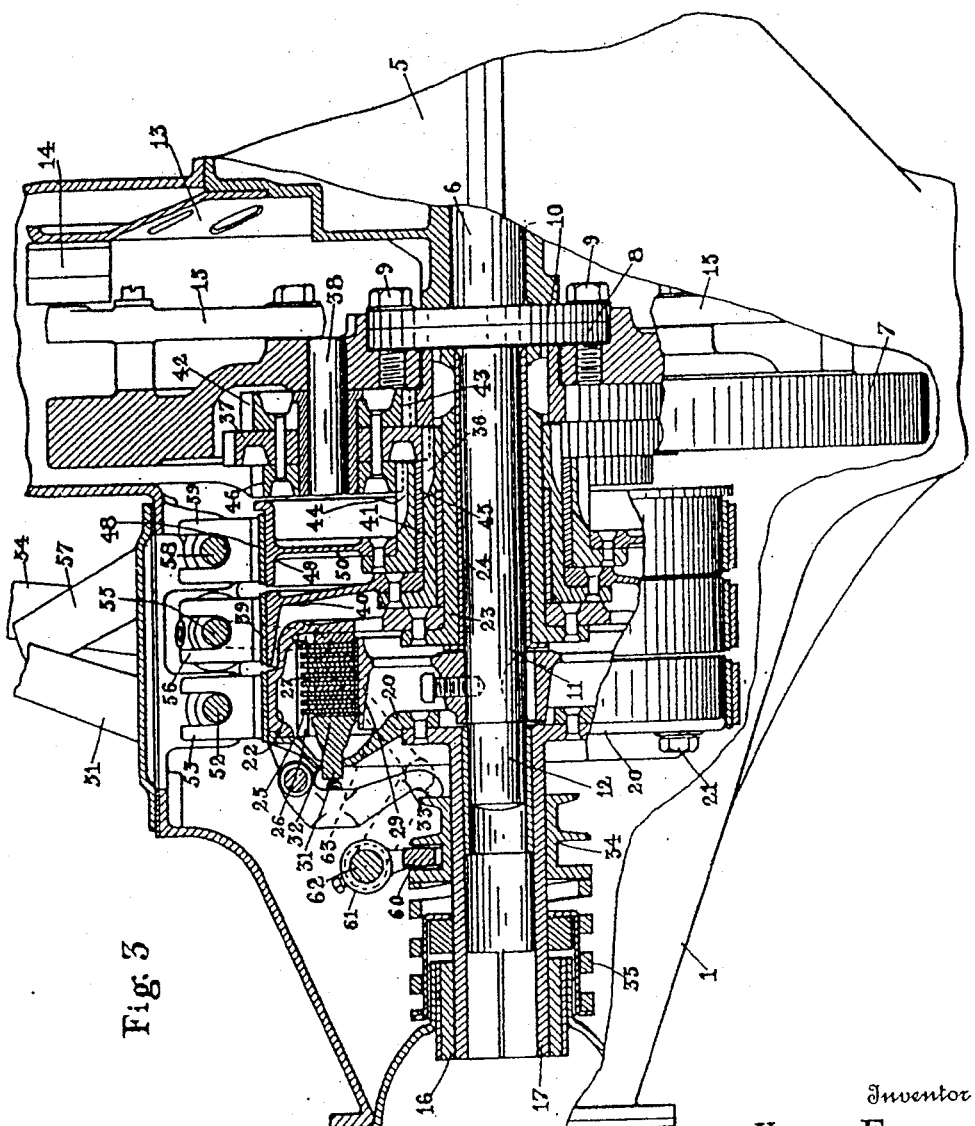
Figure 4:
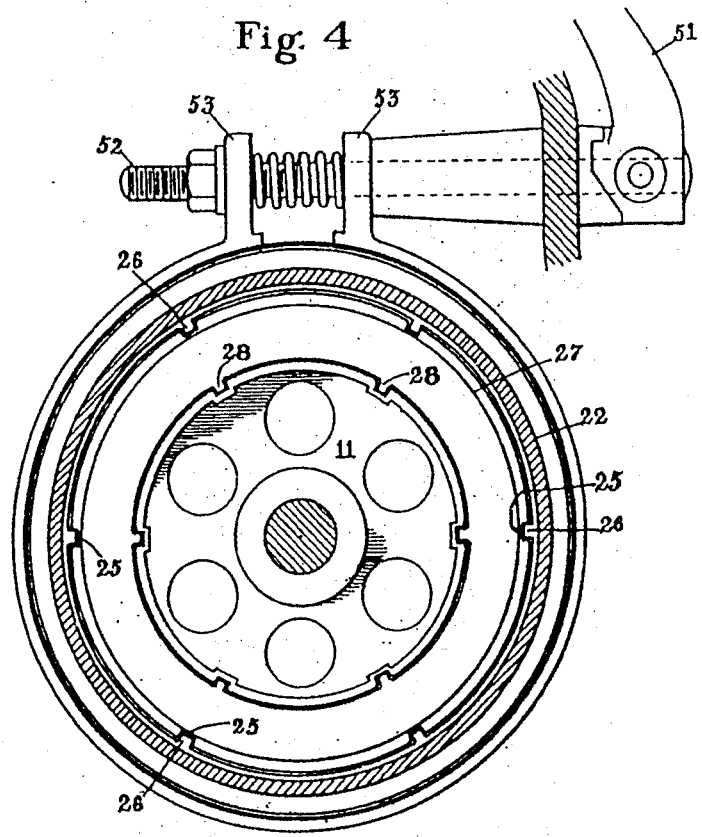

In the drawings, Figure 1 is a view in side elevation partly broken away and in section, of the driving mechanism or power plant with adjacent portions of the frame, of an automobile embodying features of the invention; Fig. 2 is a similar plan view; Fig. 3 is a view in longitudinal section in detail, of a change-speed and clutch mechanism; and Fig. 4 is a view in detail of a brake drum and clutch.

Referring to the drawings, a motor base or crank case 1 is pivotally supported at its forward end on the forward cross member 2 of a spring-supported frame and at its rear end by suitable oppositely disposed lugs 3, or like means, to the side members 4, so as to have a three-point support thereon. A motor 5, preferably of the multi-cylinder type, is placed on the case with its main shaft 6 preferably arranged longitudinally of the chassis. A fly wheel 7 is secured on the main shaft 6 either at or near the end thereof. Preferably the fly wheel has a coupling collar or flange 8 secured as by studs 9 or cap screws against a collar or disk 10 formed integrally on the end of the motor shaft with its hub 11 constituting in reality an extension of the motor shaft.

A generator for the ignition circuit of the motor is mounted thereon between the fly wheel and the cylinders of the motor and preferably consists of a stationary spider 13 secured to the motor frame and crank case with field coils 14 disposed in a ring concentric with the main shaft around the spider ring. The fly wheel, which forms the rotor of the generator, has a plurality of suitably disposed permanent magnets 15 secured on its face by suitable holding means so that the poles sweep by the ends of the cores of the magnets 14.

A tubular bearing 16 alined with the motor shaft is mounted in the outer end of the casing 1. A sleeve 17 is journaled on the reduced outer end 12 of the fly wheel hub 11 and in the bearing 16, its outer part interiorly squared, polygonal in cross section, or keyed or splined for non-rotatable engagement with one part 18 of a transmission shaft disposed longitudinally of the frame, universal joint connections indicated at 19 or like provision being made, in the shaft, and the sleeve acting as a support for the part 18. A driving plate 20 is secured on the inner end of the sleeve 17 and is connected by suitable means, as cap screws 21, to a brake drum 22 which has an extended hollow hub 23 rotatable on the inner portion of the fly wheel hub or motor-shaft extension 11, bushings 24 being interposed if desired. The friction drive hub forms in effect an extension of the sleeve 17.

The transmission shaft extension or sleeve 17 and the drive wheel hub or shaft extension 11 may be coupled to rotate in unison by a friction clutch of the multiple disk pattern housed in the brake drum 22. In the preferred construction annular thrust plates 25 having notches in their outer margins engaged by keys or splines 26 on the inner periphery of the brake drum, are arranged alternately with thrust rings 27 having inner radial lugs 28 engaging key ways or slots in the periphery of a clutch drum 29 keyed or otherwise secured on the outer end of the motor-shaft extension or fly wheel hub 11. The plates may be forced together by a push ring 31 having studs 32 reciprocable in guide apertures in the driving plate 20 that abut fingers 33 pivoted at their outer ends on the driving plate with their inner ends in contact with a shift collar 34 non-rotatable and reciprocable on the sleeve 17. The shift collar is peripherally grooved for engagement with a shifting yoke. A spring 35 encircling the sleeve and bearing 16, is in compression between the shift collar and the bearing and is adapted to normally hold the clutch in engagement.

A transmission or change-speed and reversing mechanism, in form a planetary gear train, is mounted on the fly wheel and its hub or shaft extension. In the preferred form and as herein indicated, a reduced forward speed is obtained by a sun gear 36 journaled on the brake drum hub 23 concentric with the fly-wheel hub, that is in mesh with steps 37 of planet pinions journaled on studs 38 on the side of the fly wheel. The sun gear is locked against rotation by a brake band 39 adapted to be closed on the rim of a plate 40 secured to the gear hub 41, that is preferably extended to bring the plate rim side by side with the brake drum 22. Another step 42 of the planet pinions 37 is in mesh with a gear 43 formed on or secured to the inner end of the brake drum hub 23, whereby the locking of the sun gear against rotation turns the sleeve 17 at reduced speed.

Reversal of direction is obtained by a sun gear 44 rotatable on the hub of the slow-speed sun gear 36, a suitable bushing 45 being interposed if desired. This gear meshes with suitably proportioned steps 46 of the planet pinions and may be locked against rotation by a band 48 encircling a friction drum 49 secured by a plate 50 made fast on the outer end of the gear hub which is arranged so that the drum is disposed side by side with the slow-speed and brake drums. The planet pinions may be made integrally or be built up of separate steps secured by studs or screws.

A brake lever 51 extending through the upper part of the casing 1 is secured to a rock shaft 52 journaled therein transversely to the motor shaft that passes through slotted ears 53 of the brake band, a cam face on the lever being adapted to force the ears together and thereby close the band on the brake drum. The slow-speed lever 54 on a transverse shaft 55 engaging ears 56 of the slow speed drum band and a reverse lever 57 having similar engagement through a transverse shaft 58 and ears 59 with the band encircling the reverse drum, complete the control system of the change speed train.

The shift collar 34 is engaged by a yoke 60 secured on a rock arm 61 connected to a shaft 62 journaled in the casing 1 and adapted to be operated through a link 63 from the slow speed lever or other means within reach of the car operator.

By this arrangement of the parts a unit power plant is obtained which is bodily removable from the chassis for inspection or repair. Owing to the three-point support of the base or crank-case and transmission housing in the frame, racking of the latter does not affect the plant and the change speed mechanism is so connected to the motor that it is impossible for the parts to get out of line. The transmission shaft may be entirely cut off from the motor or may be coupled directly thereto independently of the reduction train, or may be made to rotate at slow speed or in reverse when the clutch is disengaged. Furthermore the magneto or ignition generator is a part of the motor itself and as the running parts of the motor and the transmission are completely housed in the crank case or motor casing, oil may be freely applied to the parts and acts as an insulation for the generator.

As the lever and the control transmission system are connected to shafts journaled in the case, they cannot become set or bound by vibrations or twisting of the car frame so that their operation is insured.

Obviously, changes in details of construction may be made without departing from the spirit of the invention, and I do not care to limit myself to any particular form or arrangement of parts.

What I claim as my invention is:—

1. In an automobile, a motor having a fly-wheel and a shaft with an extension beyond the fly-wheel, a transmission shaft in substantial alinement with the motor shaft, a sleeve journaled on the extension in non-rotatable engagement with the transmission shaft, a brake drum rotatable on the extension secured to the sleeve, a clutch adapted to lock the drum and extension together, and a change speed and reverse drive planetary train adapted to drive the brake drum and sleeve from the fly-wheel and extension.

2. In an automobile, the combination of a transmission shaft, and a motor having a fly-wheel and a shaft with an extension beyond the fly-wheel in substantial alinement with the transmission shaft, with a sleeve journaled on the extension in non-rotatable engagement with the transmission shaft, a brake drum journaled on the extension and secured to the sleeve, a friction clutch secured to the extension within the brake drum and adapted to lock the extension and sleeve to rotate together, a gear secured on the brake drum hub adjacent the fly-wheel, a change-speed sun gear journaled on the brake drum hub against its gear with a drum on its hub adjacent the brake drum, a reverse sun gear journaled on the hub of the change speed gear with a drum on its hub adjacent the other drums, driving planet pinions rotatably secured on the motor fly-wheel with steps in mesh with the several sun gears, and means for frictionally engaging the drums severally.

3. The combination in an automobile, of a motor having a fly-wheel and a shaft with an extension beyond the fly-wheel, with a sleeve rotatable on the extension adapted to be coupled to another shaft, and a planetary gear train adapted to drive the sleeve at a different speed than the motor shaft consisting of driving planet pinions rotatably secured on the fly-wheel having change speed and reverse steps and sun gears concentrically nested rotatably on the extension severally in mesh with the steps of the pinions, and friction retarding means.

4. The combination in an automobile of a motor having a shaft, a fly wheel thereon, and a rotatable follower member in alinement therewith, of a clutch adapted to lock the member and shaft to rotate in unison, a planetary gear train mounted on the fly wheel adapted to couple the member independently of the clutch to the shaft to rotate at a different speed, a brake in which the clutch is housed adapted to arrest the member both when coupled directly through the clutch to the shaft and when connected to the shaft through the train, clutch operating means, train controlling means, and brake operating means.

5. The combination in an automobile, of a motor having a shaft, a fly wheel thereon, and a rotatable follower member alined therewith, a brake having a drum secured to the member and journaled on the shaft, means for frictionally engaging the drum, a friction clutch for coupling the shaft and member housed in the drum, and a planetary gear train mounted on the fly wheel concentrically disposed on the shaft adapted to couple the member to the shaft independently of the clutch.

6. The combination in an automobile, of a motor having a shaft, and a fly-wheel secured to the end thereof with its hub forming an extension of the shaft, with a sleeve journaled on the end of the hub, a brake drum journaled on the fly-wheel hub and secured to the sleeve, a gear on the brake drum hub adjacent the fly-wheel, a clutch drum secured on the fly-wheel hub within the brake drum, friction disks adapted when engaged to couple the brake and clutch drums together, means on the sleeve for forcing the disks into engagement, sun gears journaled concentrically on the brake drum hub in stepped relation to the drum, planet driving pinions on the fly-wheel stepped to mesh with the sun gears, and means for frictionally arresting the drums.

In testimony whereof I affix my signature in presence of two witnesses.

HENRY FORD.

Witnesses:
C. R. STICKNEY,
A. M. DORR.